(12) United States Patent
Eder et al.

(10) Patent No.: US 10,658,821 B2
(45) Date of Patent: May 19, 2020

(54) SUBSTRUCTURE FOR INCREASING THE EARTHQUAKE RESISTANCE OF A HIGH-VOLTAGE COMPONENT

(71) Applicant: Coil Holding GmbH, Eferding (AT)

(72) Inventors: Josef Eder, Rohrbach (AT); Alexander Gaun, Wilhering (AT)

(73) Assignee: Coil Holding GmbH, Eferding (AT)

( * ) Notice: Subject to any disclaimer, the term of this patent is extended or adjusted under 35 U.S.C. 154(b) by 0 days.

(21) Appl. No.: 15/326,803

(22) PCT Filed: Jul. 17, 2015

(86) PCT No.: PCT/AT2015/050171
§ 371 (c)(1),
(2) Date: Mar. 10, 2017

(87) PCT Pub. No.: WO2016/007982
PCT Pub. Date: Jan. 21, 2016

(65) Prior Publication Data
US 2017/0207608 A1   Jul. 20, 2017

(30) Foreign Application Priority Data
Jul. 18, 2014 (AT) ................. A 50502/2014

(51) Int. Cl.
*H02B 5/00* (2006.01)
*H02B 1/54* (2006.01)
(Continued)

(52) U.S. Cl.
CPC ............... *H02B 1/54* (2013.01); *E04B 1/98* (2013.01); *E04B 1/985* (2013.01); *H02B 1/04* (2013.01); *H02B 5/00* (2013.01)

(58) Field of Classification Search
CPC ... H02B 1/04; H02B 1/54; H02B 5/00; H02B 5/01; H02B 5/02; E04B 1/98;
(Continued)

(56) References Cited

U.S. PATENT DOCUMENTS 3,789,174 A    1/1974   Barkan et al.
3,921,039 A *  11/1975  Robinson ............... H02B 1/54
                                                  174/148

(Continued)

FOREIGN PATENT DOCUMENTS

CN    203456220 U    2/2014
DE    3010281 A1    10/1980
(Continued)

OTHER PUBLICATIONS

International Search Report of PCT/AT2015/050171, dated Oct. 8, 2015.

(Continued)

*Primary Examiner* — Joshua J Michener
*Assistant Examiner* — James Buckle, Jr.
(74) *Attorney, Agent, or Firm* — Collard & Roe, P.C.

(57) ABSTRACT

The invention relates to substructure (1) for increasing the earthquake resistance of at least one high-voltage component (2), in particular a choke coil (3). The substructure (1) comprises a platform (4) which is designed to receive the high-voltage component (2) in a load-bearing manner and which is suspended on a support device (6) of a support structure (7) by means of at least three tensioning means (5). The platform (4) is connected to the tensioning means (5) by means of a first articulated connection (22), and the tensioning means (5) are connected to the support device (6) by means of a second articulated connection (23), said support device (6) being supported on the ground (9) by means of at least three supports (8). The supports (8) are made of (Continued)

high-voltage insulators (11) made of an electrically insulating material, said high-voltage insulators electrically insulating the at least one high-voltage component (2) from the ground potential and supporting the at least one high-voltage component on the ground (9) in a load-bearing manner.

19 Claims, 7 Drawing Sheets

(51) Int. Cl.
 *E04B 1/98* (2006.01)
 *H02B 1/04* (2006.01)
(58) Field of Classification Search
 CPC . E04B 1/985; F16F 15/02; F16F 15/10; F16F 15/20; F16C 23/043
 USPC ....... 52/167.1; 248/562, 581, 589, 591, 636, 248/638, 906; 174/45 R; 361/602
 See application file for complete search history.

(56) References Cited

U.S. PATENT DOCUMENTS

| | | | |
|---|---|---|---|
| 3,973,078 A * | 8/1976 | Wolf | F16F 9/19 |
| | | | 174/42 |
| 4,277,639 A | 7/1981 | Olsson | |
| 4,342,067 A * | 7/1982 | Thuries | H02B 5/00 |
| | | | 361/602 |
| 4,511,115 A * | 4/1985 | Ludwigsen | B63B 35/44 |
| | | | 108/136 |
| 4,577,826 A | 3/1986 | Bergstroem et al. | |
| 7,604,215 B1 * | 10/2009 | Miller | G09B 9/12 |
| | | | 248/371 |
| 8,441,615 B2 * | 5/2013 | Hashemi | F16F 15/06 |
| | | | 248/562 |
| 9,343,879 B2 * | 5/2016 | Kuhn | H02B 1/54 |
| 9,745,769 B2 * | 8/2017 | Morta | E04H 9/10 |
| 2010/0061074 A1 | 3/2010 | Lumpkin, Jr. et al. | |
| 2011/0226929 A1 * | 9/2011 | Hiley | F16F 15/02 |
| | | | 248/562 |
| 2012/0248282 A1 * | 10/2012 | Malchev | F16F 9/53 |
| | | | 248/550 |
| 2014/0191922 A1 * | 7/2014 | Kato | H01Q 1/12 |
| | | | 343/872 |
| 2014/0192454 A1 * | 7/2014 | Ashmore | H02B 5/00 |
| | | | 361/602 |
| 2015/0048234 A1 * | 2/2015 | Almazan Campillay | |
| | | | F16F 15/022 |
| | | | 248/568 |
| 2015/0176674 A1 | 6/2015 | Khan et al. | |
| 2015/0300035 A1 * | 10/2015 | Morta | E04H 1/1205 |
| | | | 52/27 |

FOREIGN PATENT DOCUMENTS

| | | |
|---|---|---|
| EP | 2 161 803 A2 | 3/2010 |
| WO | 2013/064167 A1 | 5/2013 |
| WO | 2014/008597 A1 | 1/2014 |

OTHER PUBLICATIONS

Letter to European Patent Office by Austrian Patent Attorney dated May 18, 2016 in PCT/AT2015/050171, with English translation of relevant parts.
Letter to European Patent Office by Austrian Patent Attorney dated Sep. 21, 2016 in PCT/AT2015/050171, with English translation of relevant parts.

* cited by examiner

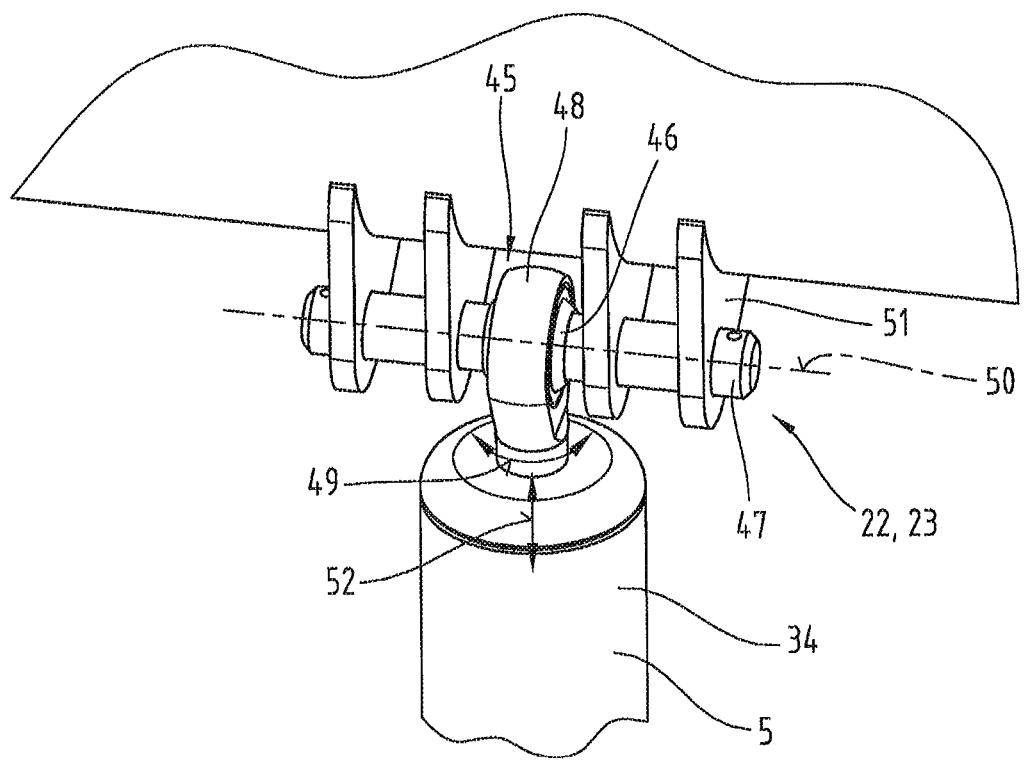
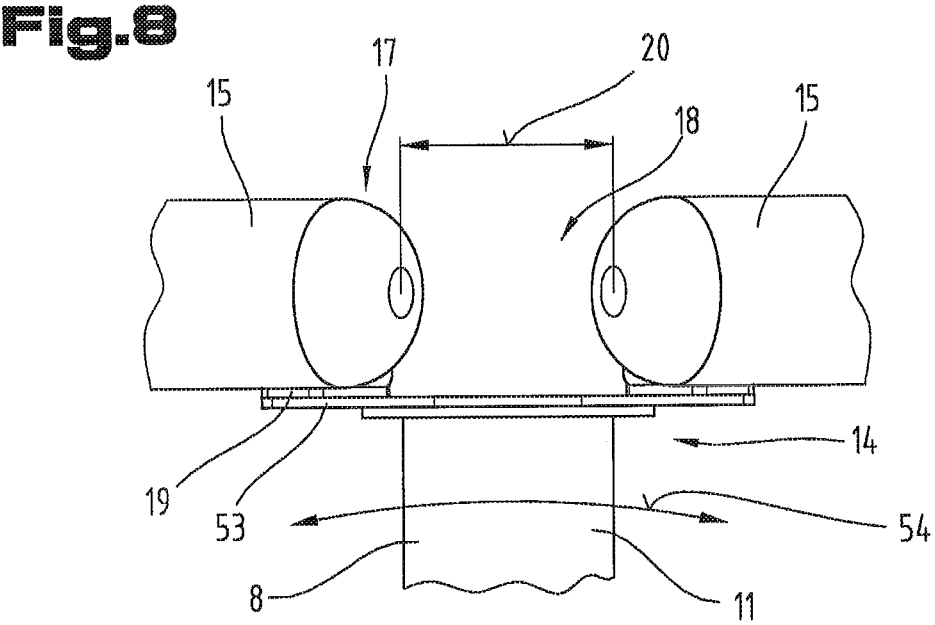

SUBSTRUCTURE FOR INCREASING THE EARTHQUAKE RESISTANCE OF A HIGH-VOLTAGE COMPONENT

CROSS REFERENCE TO RELATED APPLICATIONS

This application is the National Stage of PCT/AT2015/050171 filed on Jul. 17, 2015, which claims priority under 35 U.S.C. § 119 of Austrian Application No. A 50502/2014 filed on Jul. 28, 2014, the disclosure of which is incorporated by reference. The international application under PCT article 21(2) was not published in English.

The invention relates to a substructure for increasing the earthquake resistance of at least one high-voltage component, in particular a choke coil for electrical power supply networks.

In areas where only low demands are made on the earthquake-resistant installation of choke coils, the latter are placed on column-like support insulators. Said support insulators which are supported on the ground, and on which the weight of the choke coil bears, have to be designed to have a suitable length in order to minimise the leakage current via the insulators and avoid the latter as far as possible. Thus, it can occur that at suitably high operating or network voltages the insulators have to be designed to have a length of 10 m and more. Standard substructures are only suitable to a limited degree in earthquake areas, as an earthquake increases mechanical loading on standard structures.

In earthquakes the highest transverse accelerations take place in an excitation frequency range of the earthquake of about 1 Hz to 10 Hz. The aforementioned structures with support insulators of such length have a resonant frequency, which lies within the range of this critical excitation frequency. Thus with such a low level of damping of the substructure resonance problems may occur, which the substructure of the choke coil, mainly due to the high mechanical loads from the relatively heavy high-voltage component, can no longer withstand.

WO 2014/008597 A1 describes a damping support bearing, which is provided for arrangement between a porcelain insulator and an air core choke coil. Its properties are only satisfactory to a limited degree when used in areas prone to earthquakes.

From U.S. Pat. No. 3,789,174 A a substructure is known for installing a transformer in an earthquake safe manner and a power switch. The substructure comprises a support structure, which is anchored in the ground and is designed in the form of a two-row portal. The support structure comprises support columns on which a bearing support is attached, which bearing support spans two support columns spaced apart from one another. Furthermore, the substructure comprises a platform, which is suspended by means of tensioning rods onto the bearing support of the support structure. The tensioning rods, which are mounted in an articulated manner both on the platform and on the bearing support, are aligned vertically relative to one and in parallel. By means of this arrangement the platform can move in an oscillating manner relative to the support structure, whereby movements of the substructure on which the support structure is anchored are only in dampened form on the platform. On the platform column-like insulators are attached, wherein in each case a high-voltage carrying part, for example a transformer, is attached onto a column-like insulator so that the high-voltage carrying part is spaced apart suitably far from the platform, in order to reduce or at least largely avoid leakage currents and in order to avoid flashovers.

From DE 30 10 281 A1 a substructure is known for installing a transformer or an inductor in an earthquake-resistant manner. The substructure comprises a support structure, on which, similar to the structure of a swing, at both ends of a tubular bearing support two support columns arranged at an acute angle to one another are arranged, which support columns are secured to the ground and secure the bearing support bridging the support columns. Mounting supports are attached onto the tubular bearing which are pivotable about the bearing support axis. Tensioning means are attached onto said mounting supports on both sides of the bearing support axis, wherein transformers are suspended on the tensioning means. The tensioning means are designed here as insulator chains. Four insulator chains are attached to each transformer, wherein for each transformer two pairs of insulator chains are secured to the pivotable mounting support. The insulator chains running in pairs in the direction of the pivotable mounting supports are arranged in a V-shape, wherein the distance of the insulator chains from one another on the transformer is smaller than the distance of the insulator chains from one another on the pivotable mounting support. In addition, the two pairs of insulator chains are arranged in a V-shape relative to one another as viewed in transverse direction.

U.S. Pat. No. 4,577,826 A and EP 2 161 803 A2 disclose a platform for high-voltage components. The platform is arranged on upright support columns in the form of insulators. To increase the earthquake resistance a strut is provided by two insulators arranged diagonally between upright support columns. The diagonally arranged insulators are coupled to one another by means of cables, wherein the cables are coupled to a damper.

WO 2013064167 A1 discloses a device for supporting high-voltage devices in an electrically insulating manner with electrically non-conducting support insulators, which are set up for elevating a support platform mounting the high-voltage devices on a foundation in an electrically insulated manner. Each support insulator extends from a support connected to the support platform to the foundation, wherein the insulators are arranged at an angle to one another such that two support insulators connected to the said support span an acute angle relative to the common support.

The embodiment described in U.S. Pat. No. 3,789,174 A has the disadvantage that due to the structure of the substructure the first resonant frequency can only be influenced insufficiently when using very long insulators, in order to push it beyond the critical range. Furthermore, the substructure only has insufficient damping.

The embodiment described in DE 30 10 281 A1 has the disadvantage that by suspending the transformer on only one horizontally running support, the transformer may tilt if there is an earthquake. Furthermore, with the shown structure only one transformer can be mounted which has limited weight, without the substructure deforming or breaking.

The underlying objective of the invention is to create an improved substructure for the installation of a high-voltage component in an area at risk of earthquake which is as fail-safe as possible.

Said objective of the invention is achieved by the features described herein.

According to the invention a substructure is provided for increasing the earthquake resistance of at least one high-voltage component, in particular a choke coil for electrical power supply networks. The substructure comprises a platform, which is designed for mounting the high-voltage component in a load-bearing manner and which platform is suspended by at least three tensioning means on a support device of a support structure. The platform is connected by a first articulated connection to a first end section of the tensioning means, and in a second end section the tensioning means are connected by a second articulated connection to the support device. The support device is supported by means of at least three supports on the ground. The supports are formed by high-voltage insulators made from electrically insulating material, which insulate the at least one high-voltage component from ground potential and are supported in a load-bearing manner on the ground.

An advantage of the design according to the invention is that the supports can be made from an insulating material with a high longitudinal extension or structural height, in order to avoid leakage currents through the insulating material as far as possible. In particular, with regard to high, anticipated earthquake stresses in combination with relatively high operating stresses of the high-voltage component the construction according to the invention has particularly advantageous effects. The high-voltage component with an elevated voltage potential together with the platform also with an elevated voltage potential can be arranged by means of support columns of a suitable length in the form of insulators at a suitable distance from the ground, in order on the one hand to avoid a voltage flashover relative to the ground potential and on the other hand to be able to achieve sufficiently high creepage distances between the high-voltage potential and the ground potential. The design according to the invention thereby has a particular advantage for the installation of high-voltage components, in particular of dry-insulated choke coils, with an operating voltage of more than 500 kV. The substructure according to the invention can be designed to be as space-saving as possible, whereby it is possible to use the available space for the installation of a choke coil compared to the previously known embodiment according to U.S. Pat. No. 3,789,174 A as efficiently as possible and to keep the space requirement for the installation as low as possible. It is also an advantage that by means of a freely selectable length or by means of easily configured length dimensioning of the tensioning means according to requirements the resonant frequencies, in particular the first resonant frequency or first natural frequency of the substructure or the whole system consisting of the substructure and choke coil can be influenced and can thus be moved into a desired or more advantageous frequency range. It is particularly advantageous that a large proportion of the mass of the system vibrates at the first resonance frequency. By means of the substructure according to the invention the first natural frequency of the system can be influenced accordingly, so that it is outside the excitation frequency range of the earthquake, at which the greatest lateral accelerations occur. Furthermore, the high-voltage insulators can have a certain damping effect, whereby the maximum accelerations occurring on the platform can be reduced.

Furthermore, it can be advantageous if the length of the tensioning means, in particular a distance between the first articulated connection and the second articulated connection, is between 0.3 m and 3 m, in particular between 1.3 m and 1.5 m. It is an advantage in this case by means of a tensioning means of this length first resonance frequencies of the whole system according to the invention can achieved, which are at about 0.4 Hz to 0.5 Hz. Thus in this way the relevant first resonant frequency of the whole system can be outside the critical excitation frequency of a typical earthquake.

Furthermore, it is advantageous if the tensioning means are aligned to be perpendicular and are arranged in parallel between the support device and the platform. It is an advantage in this case that during the earthquake and thus during the horizontal vibration of the platform there is no tilting of the platform from the vibrational movement. Furthermore, it is achieved in this way that the platform has a sufficient degree of freedom to enable a vibrational movement of the platform and a horizontal vibrational movement of the platform does not cause tension inside the tensioning means, by which the latter could be damaged.

Furthermore, it is possible that the tensioning means are designed in the form of tensioning rods. The tensioning rod has the advantage that a tensioning rod can also absorb compressive and shearing forces to a limited degree. Thus with a vertical vibration of the substructure the "hopping" movement of the platform is reduced or avoided. Furthermore, tensioning rods can be produced easily, and also an exact or constant length of the tensioning rods in the production method can be achieved easily.

Alternatively to this, it is possible that the tensioning means are formed by cables. The use of cables has the advantage that in particular the articulated connections between the cable and platform, and between the cable and support device can be designed to be simple and inexpensive, as no rotary joint is required, but, due to the flexibility of the cable, the cable itself provides an articulated or angle-compensating suspension. Furthermore, a cable can be made from an elastic material or can be relatively elastic in itself, whereby a flexible or elastic suspension of the platform in vertical direction can be achieved.

Furthermore, it is possible that the tensioning means are made from an electrically insulating material. Here it can be an advantage that the total length of the insulation distance between the high-voltage component and ground potential can be extended. Thus any leakage currents can be reduced further and the insulation can be improved overall.

An embodiment is also advantageous according to which the support device comprises at least three bearing support elements, which bearing support elements have at least approximately the same length and are arranged next to one another in a ring or circle, wherein at least two bearing support elements are arranged at a distance from one another at their facing ends. By means of the circle-like arrangement of the bearing support elements it is possible that particularly for high-voltage components that are round in cross-section, such as air core choke coils, the substructure can be designed to be as space-saving as possible. Furthermore, by means of the circle-like arrangement of bearing support elements each with the same or approximately the same length it is possible to achieve that a load applied by the high-voltage component can be distributed evenly on the support device and thus on the support structure. It is thus ensured that the high-voltage insulators designed as support columns are loaded as evenly as possible. Since at least two bearing support elements are arranged at a distance from another on their facing ends faces, it is possible to prevent the metal, circular or ring-shaped bearing support elements forming a fully closed, electrically conductive ring, if in addition said distance is not electrically connected or bridged by a metal element, such as e.g. by a support place arranged underneath. An electrical insulation or separation over this distance can be achieved for example by an electrically insulating intermediate layer, which can be arranged between the base of a bearing support element and the underlying support surface of the high-voltage insulator. In the bearing support elements arranged in a circle, induced voltage and undesirable induced losses can thus be avoided or reduced.

According to one development it is possible that the two end faces of the bearing support elements arranged in a row are supported respectively on a common high-voltage insulator. It is an advantage in this case that the bearing support elements can thus be connected in a stable and simple manner to the respective high-voltage insulators or can be supported on the latter. Furthermore, the bearing support elements can thus be mounted individually on the high-voltage insulators, whereby the assembly of the substructure, in particular the support structure, can be simplified.

Furthermore, it can be advantageous if at least one transitional section is formed between consecutive bearing support elements arranged in a ring is designed to be electrically insulating. By means of this embodiment it is possible to prevent the bearing support elements arranged in a circle from forming an electrically conductive ring in which induction can occur thus causing unwanted induced losses.

Furthermore, it can be possible that an elastic intermediate element is arranged between at least one of the high-voltage insulators and the bearing support elements supported thereon. It is an advantage in this case that relative movements between the high-voltage insulator and bearing support element, which occur during an earthquake, can be balanced out or cushioned by the elastic intermediate element, so that it is possible to reduce the risk of the mechanical failure of the connection between the high-voltage insulator and bearing support element.

Furthermore, it is possible that at least one of the tensioning means in the longitudinal centre is connected by at least one of the bearing support elements to said bearing support element. It is an advantage in this case that in this way the tensioning means is arranged as far as possible from the high-voltage insulator. Thus the risk of a possible flashover between the tensioning means and insulation can be generally reduced and also lessened during an earthquake.

According to a particular embodiment it is possible that on the platform at least one bearing support element is arranged, by means of which the high-voltage component can be mounted at a vertical distance from the platform. Such a bearing support element has the advantage that in this way the high-voltage component is spaced apart from the metal platform. It is thus possible that the high-voltage component, as viewed in vertical direction, is not surrounded or is only somewhat surrounded by the bearing support elements. In this way it is possible to reduce the risk of a possible flashover between the high-voltage component and bearing support elements. In particular, it can be advantageous if a longitudinal extension of the bearing support elements is selected to be about the same size as a longitudinal extension of the tensile elements. In this way it is possible that the high-voltage component, as viewed in vertical direction, is positioned fully or at least mostly over the support device, in particular is placed at a sufficient distance from the bearing support elements.

According to an advantageous development it may be possible that the at least one bearing support element is made from an electrically insulating material, so that the high-voltage component is electrically insulated from the platform. In this way it can be an advantage that the total length of the insulation distance between the high-voltage component and ground potential can be extended. This is an advantage for the leakage current behaviour of the whole arrangement.

In particular, it can be advantageous that at least one field control device, in particular a corona ring is arranged on at least one of the articulated connections. This embodiment is designed to reduce or largely avoid electrical discharge, which can occur in the region of the relatively pointed articulated connections.

Furthermore, it can be advantageous that the platform is designed to be star-shaped in a view of the contact plane of the support structure, wherein individual support arms of the platform are connected to one another at a common nodal point. In this way it is an advantage that the construction of the platform can be as simple as possible, in order to save weight and thus to avoid excessive loading of the high-voltage insulator. Furthermore in this way a ring closure inside the platform can be avoided, whereby possible losses caused by such a ring closure can be largely avoided.

Furthermore, it is possible that the high-voltage insulators for forming the support structure are arranged axially parallel to one another. It is an advantage in this case that by means of an axially parallel arrangement of the high-voltage insulator to one another, the substructure can have a certain degree of flexibility or tilting variability. Thus the high-voltage insulators can spring back elastically in an earthquake, whereby mechanical voltage peaks in the high-voltage insulators are reduced.

Furthermore, it can be advantageous that the tensioning means are made from an elastic material and/or comprise at least one spring element, wherein at least one of the tensioning means if necessary comprises a vibration damper. It is an advantage in this case that in that way not only horizontal vibrations, but also vertical vibrations can be absorbed. In this way a vertical "hopping" movement of the platform can be reduced or fully prevented. In this way also the forces acting on the substructure in an earthquake can be reduced.

Lastly, it is possible that the first and/or second articulated connection is formed by a spherical head connection, which comprises an articulated spherical element, which is passed through by a bolt. It is an advantage in this case that with such a spherical element the axis of rotation of the articulated bolt connection and the axis of rotation of the articulated spherical head connection are not displaced relative to one another at a fixed point in the longitudinal axis of the tensioning means. In this way it is possible that the platform can oscillate freely, without mechanical tensions being caused by longitudinal displacement in the tensioning means.

For a better understanding of the invention the latter is explained in more detail with reference to the following Figures.

In a much simplified, schematic representation:

FIG. 7 shows a detailed view of an articulated connection between the tensioning means and support device;

FIG. 8 shows a detailed view of a connection and support between a high-voltage insulator and bearing support elements;

Figure 1:
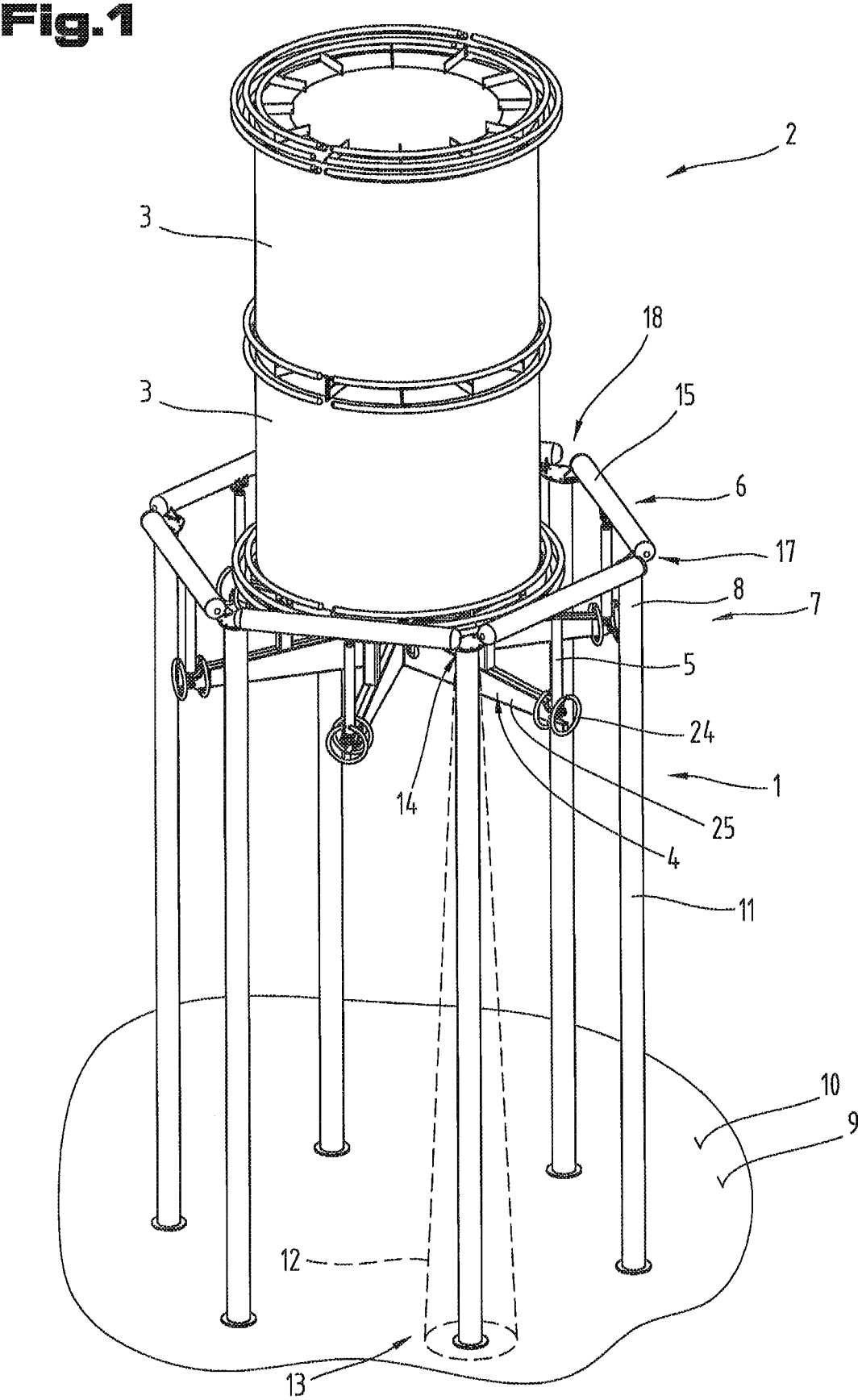
FIG. 1 shows a perspective view of a choke coil, designed for example to have two tiers, with a mechanical substructure for improved earthquake resistance.

First of all, it should be noted that in the variously described exemplary embodiments the same parts have been given the same reference numerals and the same component names, whereby the disclosures contained throughout the entire description can be applied to the same parts with the same reference numerals and same component names. Also details relating to position used in the description, such as e.g. top, bottom, side etc. relate to the currently described and represented figure and in case of a change in position should be adjusted to the new position.

FIG. 1 shows a perspective view of a substructure 1 for a high-voltage component 2, wherein the high-voltage component 2 is secured or supported on the substructure 1. The shown substructure 1 is used in particular for positioning high-voltage components 2 in electrical power supply systems to be as fail-safe as possible or in order to ensure increased earthquake resistance.

The substructure 1 according to the invention has proved to be an advantageous embodiment of the substructure 1, in particular with the use of relatively heavy high-voltage components 2, such as a dry-insulated air core choke coil 3. Such choke coils 3, as shown in FIG. 1, can have a unit weight of 10 tonnes and above. If, as shown in FIG. 1, such choke coils 3 are stacked above one another vertically, regardless of the vertical distance apart, thus in typical applications a mass of 30 tonnes and more can act on the substructure 1.

In addition, it is possible that an operating voltage of 800 kV and more can be applied to such choke coils 3. Thus high demands are made of the substructure 1 not only with regard to the mechanical load, but also relative to its electrical insulation from earth potential.

Figure 2:
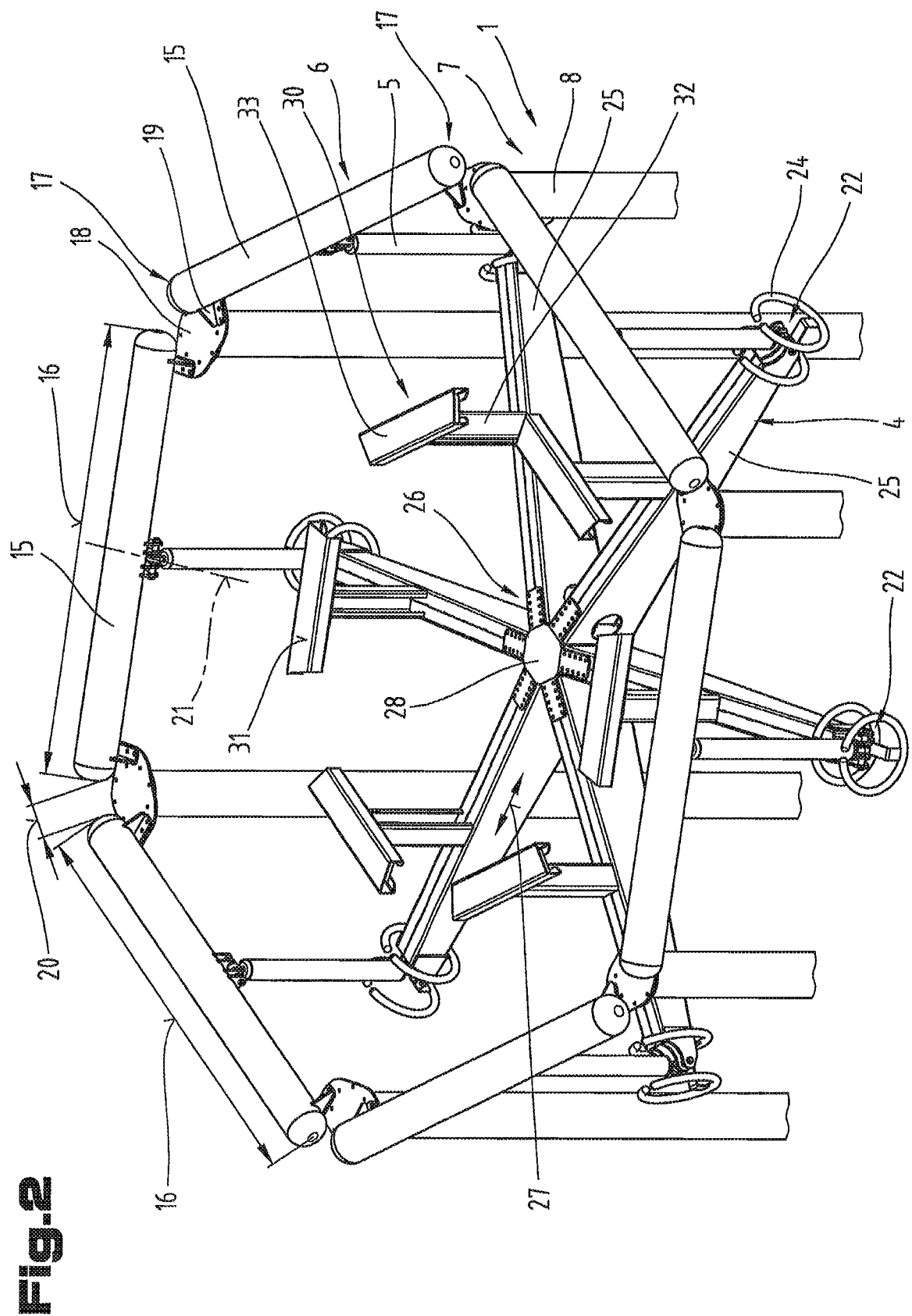
FIG. 2 shows a perspective view of the substructure with a central platform for supporting a choke coil or other high-voltage component in detail.

FIG. 2 shows the substructure 1 in a further perspective view, in which the choke coils 3 are not shown, wherein the same component numerals and component names are used for the same parts as used for the preceding FIG. 1. To avoid unnecessary repetition reference is made to the detailed description of the preceding FIG. 1. The description of the figures can be best followed from an overview of FIGS. 1 and 2.

As shown in FIG. 1, the substructure 1 comprises a platform 4 on which the choke coil 3 is supported in a load-transferring manner. The platform 4 is suspended movably by tensioning means 5 on a support device 6 in horizontal direction. Said support device 6 is part of a support structure 7. The support structure 7 also comprises supports 8, which support the support device 6 on the ground 9. The ground 9 is defined in particular by a contact plane 10, to which the supports 8 are anchored or secured by means of a form-fitting or force-fitting connection. The contact plane 10 can be formed for example by a concrete base, such as a strip foundation or point foundation. In specific geographical areas it may also be necessary for the contact plane 10 to be formed for example by a column foundation. According to the invention the supports 8 are designed as high-voltage insulators, which due to their material properties can electrically insulate the increased operating voltage potential of a high-voltage component 2 from the ground potential on the ground 9. Such high-voltage insulators 11 have as standard a rib-like surface contouring. For a simplified, clear representation in all of the figures the high-voltage insulators 11 are shown to have a tube-like structure.

As shown in FIG. 1 it can be advantageous if the substructure 1 comprises six high-voltage insulators 11. This number of high-voltage insulators is only an advantage for the present example embodiment, in which choke coils 3 are supported with a total mass of about 34 tonnes on high-voltage insulator 11 with a length of about 10 m. If the total mass of the choke coils 3 is greater, it can be necessary to use more high-voltage insulators 11. However, if the load or the required structural height is smaller, it is also possible that as a minimum three high-voltage insulators 11 can be used. In addition, the respective present earthquake zone has an effect on the dimensioning of the substructure 1.

With regard to the selection of a suitable material for a high-voltage insulator 11 designed as a support 8 high demands are made on the strength and to a certain extent the elasticity of the materials. Preferably, porcelain insulators or composite insulators are used here. Furthermore, it is also possible that the used insulators are designed instead as a tubular structure as a conical high-voltage insulators 12, or also in one piece as combinations of conical and tubular high-voltage insulators. Such a conically designed high-voltage insulator 12 is indicated schematically in FIG. 1 by dashed lines. The advantage of such an insulator of this design can be that increased bending stresses, which can occur at the insulator base 13, can be absorbed more effectively by a larger insulation cross-section, wherein lower bending stresses, which occur at the insulation head 14, can also be absorbed by a smaller insulation cross-section. Thus the mass and in connection with this the production costs for such a high-voltage insulator 12 are kept as low as possible, wherein in addition the strength properties of the high-voltage insulator 12 can be improved.

As shown in the overview of FIG. 1 and FIG. 2, the support device 6 comprises a plurality of bearing support elements 15, which are arranged in a ring or circle. In this case it is possible that the bearing support elements 15 each have the same length 16. In this way, as shown in FIG. 2, a ring or circular arrangement of the bearing support elements 15 relative to one another is formed, wherein a circle can be inscribed inside the bearing support elements 15.

Furthermore, it is possible that the bearing support elements 15 are supported on their end face 17 respectively on a common high-voltage insulator 11. In this case it is possible that a transitional section 18 is formed, in which the bearing support elements 15 are spaced apart from one another and are connected to the high-voltage insulator 11 and are thus insulated from one another electrically. Furthermore, it is possible that the bearing support elements 15 each have a base 19 at their end face 17, by means of which the bearing support elements 15 are supported on the high-voltage insulator 11.

By having a bearing support element 15 respectively on its end face 17 on a high-voltage insulator 11 and by ensuring that two end faces 17 of adjacent bearing support elements 15 bear on a common high-voltage insulator 11, the number of bearing support elements is equal to the number of high-voltage insulators 11. The exact number of bearing support elements 15 or high-voltage insulators 11 required depends on the weight of the high-voltage component 2 to be supported and on the operating voltage of the high-voltage component 2 or on the dimensions of the high-voltage insulator 11 and the bearing support elements 15. In contrast to the high-voltage insulators 11, which are subject to bending stresses and buckling, the bearing support elements 15 are subject to bending stresses.

With the arrangement of the individual bearing support elements 15 relative to one another it is also possible that two adjacent bearing support elements 15 are arranged spaced apart from one another at their end faces 17 at a distance 20 from one another. This may be necessary so as not to form a conducting ring closure with the bearing support elements 15, in which electric voltage can be induced. A detailed view of the possible connection between the bearing support element 15 and high-voltage insulator 11 is described and shown in more detail in the following in FIG. 8.

Furthermore, it is possible that the tensioning means 5, which are used for suspending the platform 4, are secured respectively in the longitudinal centre 21 of a bearing support element 15. This has the advantage that the tensioning means 5 are spaced apart as far as possible from the high-voltage insulators 11 and thus by means of the oscillating movement of the platform 4 in the case of an earthquake fall there is no contact between the platform 4 and high-voltage insulator 11. In this way however the risk is also lowered of a voltage flashover between the platform 4 and high-voltage insulator 11.

By suspending the tensioning means 5 in the longitudinal centre 21 of a bearing support element 15 the greatest bending moment on the bearing support element occurs exactly in the longitudinal centre 21. With a static loading of the bearing support element 15, i.e. during normal use when there is no earthquake, there is only a bending moment about the transverse axis of the bearing support element due to the mass of the suspended components. However, if an earthquake occurs, due to the oscillation movement of the platform 4 there is also a horizontally acting force on the bearing support elements 15. This needs to be taken into consideration for the selection of suitable bearing support elements 15. An I-bearing support for example would be highly suitable for receiving bending moments about the transverse axis, with additional bending moments about the vertical axis, due to horizontal transverse forces however there is a risk of the bearing support buckling. For this reason, it has proved to be advantageous to use a hollow profile as a bearing support element 15, such as a shaped pipe, which has a high surface inertia moment relative to the transverse axis and also the vertical axis.

Furthermore, it is possible that the tensioning means 5 are connected by means of a first articulated connection 22 to the platform 4 and by means of a second articulated connection 23 to the support device 6, in particular a bearing support element 15. Possible embodiments of the articulated connection 22, 23 are shown and described in more detail in the following in FIG. 7.

As also shown in FIG. 2, it is possible that in the area of the first articulated connection 22 and/or in the area of the second articulated connection 23 a field control device, in particular a corona ring 24 or a spherical cap-shaped closure element is arranged. By using a corona ring 24 or a spherical cap-shaped closure element it is possible to avoid or prevent as far as possible the occurrence of electrical discharge or partial discharge into the atmosphere.

Figure 3:
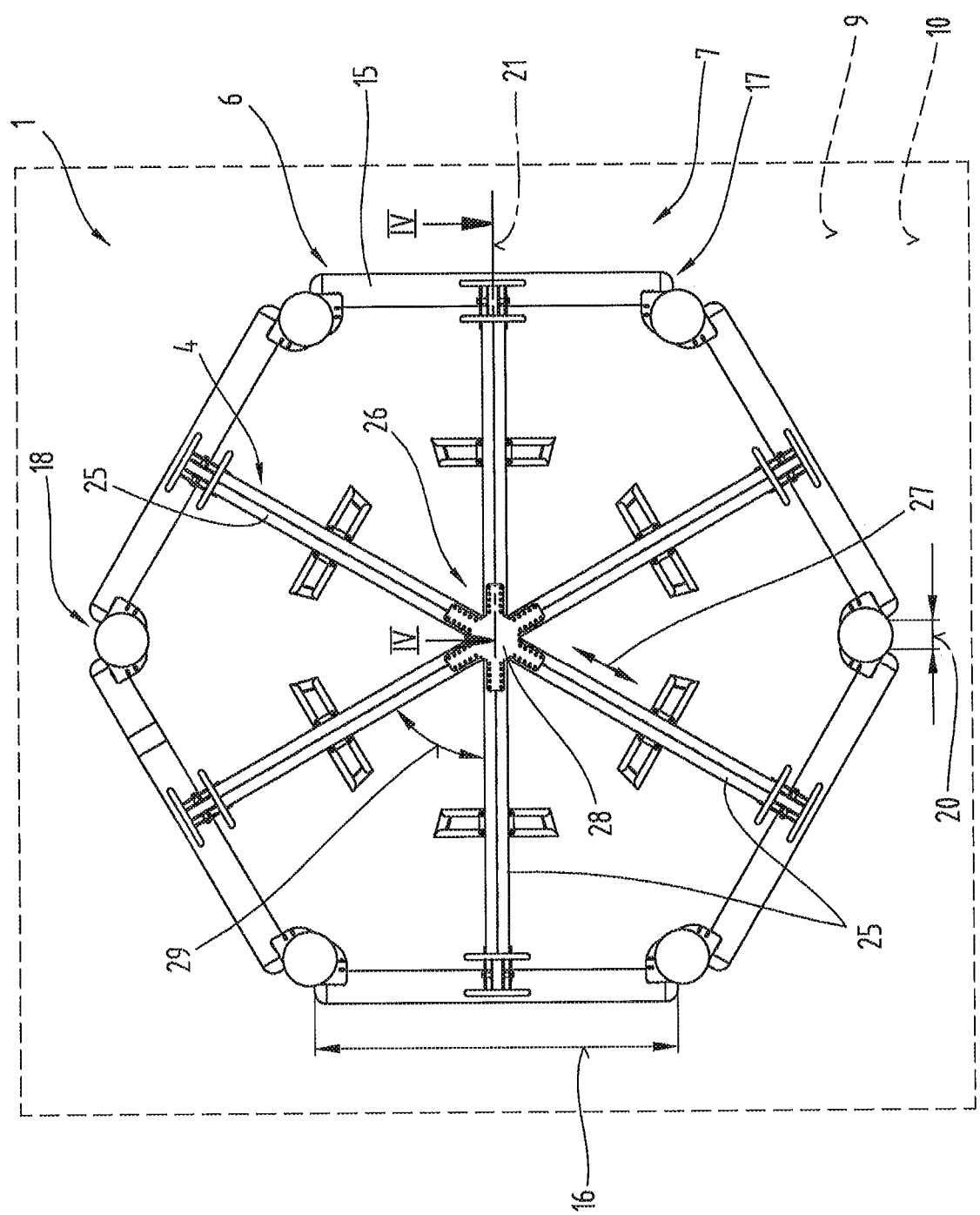
FIG. 3 shows the substructure according to FIG. 2 in a view from below.

FIG. 3 shows the substructure 1 in plan view, wherein again for the same parts the same reference numerals and component names have been used as in the preceding FIGS. 1 and 2. To avoid unnecessary repetition reference is made to the detailed description in the preceding FIGS. 1 and 2.

As shown in an overview of FIG. 2 and FIG. 3, it is possible that the platform 4 is formed by a plurality of support arms 25, which are connected to one another at a central nodal point 26. By means of this star-shaped arrangement of the individual support arms 25 it is possible that a tensioning means 5 can be secured respectively to a support arm 25.

Alternatively to an embodiment variant in which the support arms 25 are secured to one another at a common nodal point, it is also possible that the support arms 25 are secured on a centrally arranged connecting element, such as an annular structure.

The support arms 25 are preferably designed so that they have varying cross-sectional dimensions over their longitudinal direction 27, wherein the cross-section is adjusted to the respective bending moments. As a support arm 25 is secured respectively to a tensioning means 5, the number of support arms 25 is preferably selected to be the same as the number of tensioning means 5 provided.

At the common nodal point 26 the individual support arms 25 can be connected to one another by means of a material-bonded connection, such as a welded connection. In an alternative variant it is also possible that the individual support arms 25 are screwed to one another by means of a screw connection. Such a screw connection can be obtained for example by means of a so-called node plate 28, which is connected at the nodal point 26 to the individual support arms 25.

As shown in FIG. 3, an angle 29, at which two support arms 25 are arranged relative to one another, is dependent on the number of support arms 25 used. Preferably, the platform 4 is designed so that the angle 29 between the individual support arms 25 is the same size, resulting in the characteristic, star-shaped appearance of the platform 4.

In a first embodiment variant, it is possible that the high-voltage component 2, in particular the choke coil 3, is secured directly to the platform 4.

In an alternative variant, as shown in FIG. 2, it is possible that bearing support elements 30 are arranged on the platform 4, in particular on the support arms 25, which bearing support elements are provided for mounting the high-voltage component 2. The bearing support elements 30 are provided in particular to space the high-voltage component 2 apart from the metal platform 4. This has the advantage that the support device 6 is not arranged directly in the vicinity of the high-voltage component 2, whereby the risk of a possible flashover between the high-voltage component 2, in particular choke coil 3, and support device 6 is reduced.

The bearing support elements 30 are preferably arranged approximately in the centre of a support arm 25. The bearing support elements 30 form a standing surface 31, on which the high-voltage component 2 can be placed and which can support the high-voltage component 2 sufficiently effectively. In order to achieve a suitable size of standing surface 31 for optimum load distribution, it is possible that the bearing support elements 30 also comprise in addition to a strut 32 a connecting element 33, by means of which the standing surface 31 is enlarged. The connecting element 33 can be designed for example as a form profile, which can be joined by a force-fitting connection, such as a welding connection, to the strut 32.

Figure 4:
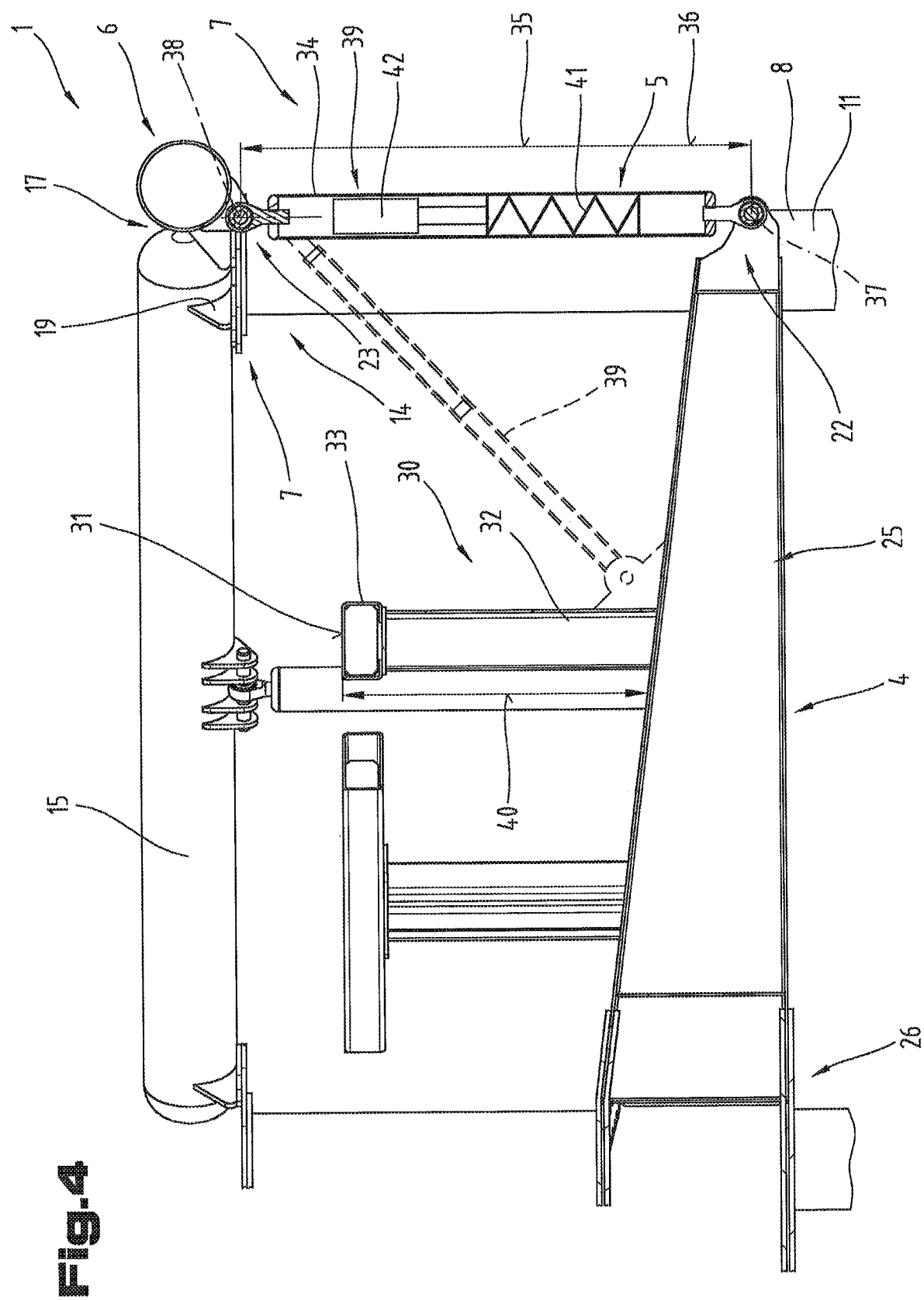
FIG. 4 shows a vertical longitudinal cross-section of the substructure, in particular according to the section line IV-IV in FIG. 3.

FIG. 4 shows the cross-section of the support arm 25 varying in longitudinal direction, where it can also be seen that the cross-section is adjusted at least approximately to the course of the bending moment. In order to design the support arm 25 with the greatest possible rigidity to be as light as possible, it is possible that, as shown in FIG. 4, the support arm 25 is designed as a form element, in particular as a sheet metal forming element.

FIG. 4 shows a cross-sectional view, in particular according to the section line IV-IV of FIG. 3, wherein the same reference numerals and component names are used as in the preceding FIGS. 1 to 4. To avoid unnecessary repetition, reference is made to the detailed description of the preceding FIGS. 1 to 3.

In a preferred embodiment, as shown in FIG. 4, the tensioning means 5 can be designed as a tensioning rod 34. Furthermore, in FIG. 4 the first articulated connection 22 and the second articulated connection 23 are shown clearly, which can be configured for example as a bolt connection. In particular, it is shown that a length 35 of the tensioning means 5 is defined by a distance 36 of the articulated connections from one another. In particular, the distance 36 extends from an axis of rotation 37 of the first articulated connection 22 to an axis of rotation 38 of the second articulated connection 23. The articulated connections 22, 23 are each formed in the end sections or end areas of the tensioning means 5.

The length 35 of the tensioning means 5 influences the first resonant frequency of the whole system. To be more precise, the first resonant frequencies of the whole system are influenced by the length of the high-voltage insulators 11 and the length 35 of the tensioning means 5 or their relationship to one another, wherein due to the complexity of the whole system the direct connection cannot be expressed in a simple formula.

As also shown in FIG. 4 in a preferred embodiment variant, in the position of rest the platform 4 of the axis of rotation 38 of the second rotary joint 23 is positioned vertically above the axis of rotation 37 of the first rotary joint 22. There is thus a vertical alignment of the tensioning means 5 in the position of rest of the platform 4.

Furthermore, it is possible that, as shown schematically in FIG. 4, at least one damping element 39 is arranged between the platform 4 and support structure 7, by means of which a horizontal vibrational movement can be damped. For the possible positioning of the damping element 39 there are different possible embodiments which are not described in detail here.

As also shown in FIG. 4, a length 40 of the bearing support element 30 is designed as a function of the length 35 of the tensioning means 5. The length 40 of the bearing support element 30 is hereby selected, as already mentioned, to be so long that a high-voltage component 2 placed on the standing surface 31 is placed as far as possible above the support device 6 or at least mostly above the support device 6 and thus has the greatest possible distance from the support device 6.

Furthermore, it is possible that, as indicated schematically in FIG. 4, the tensioning means 5 is made from an elastic material and/or comprises at least one spring element 41, by means of which the length 35 of the tensioning means of 5 can be varied elastically. Such a spring element 41 could for example form part of the tensioning means 5. It is possible in this case for example that an intermediate section of the tensioning means 5 is formed by the spring element 41. Furthermore, it is also possible that the tensioning means 5 is designed to be telescopic and the spring element 41 is arranged inside the tensioning means 5.

Furthermore, it is also possible that, as indicated schematically, a vibration damper 42 is formed, by means of which the elastic movement of a tensioning means designed with a spring element 41 is damped. Also this vibration damper 42 can be integrated for example into the tensioning means 5. Furthermore, it is also possible that the vibration damper 42 is arranged parallel to the tensioning means 5.

Figure 5:
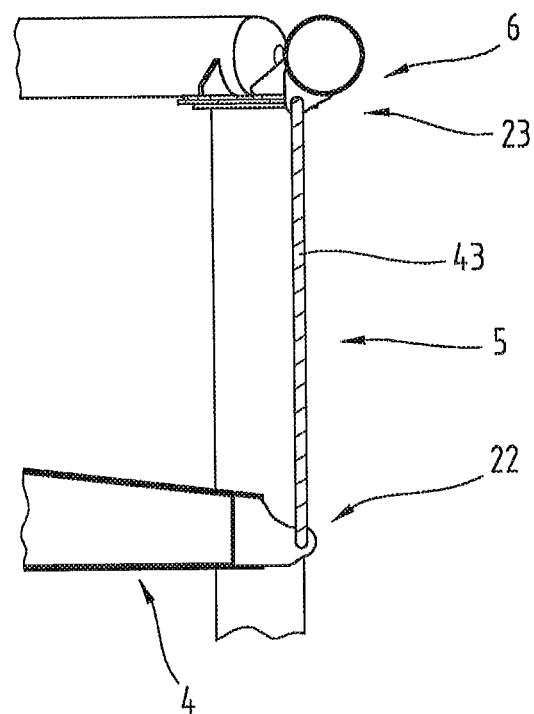
FIG. 5 shows a vertical cross-section of the substructure, in particular according to the section line IV-IV in FIG. 3 with a cable as tensioning means.

In FIG. 5 a further and possibly independent embodiment of the substructure 1 is shown, wherein for the same parts the same reference numerals and component names have been used as for the preceding FIG. 4. To avoid unnecessary repetition, reference is made to the detailed description of the preceding FIG. 4.

In the embodiment variant shown in FIG. 5 it can be seen that it is also possible that the tensioning means 5 are designed for example as a cable 43. The cable 43 can be secured for example by using a rope eye on the platform 4 or on the support device 6, wherein by means of the inherent flexibility of the cable 43 the first articulated connection 22 or the second articulated connection 23 is achieved. Thus also by means of such a system or such a cable connection the platform 4 can be vibrated freely in horizontal direction. Furthermore, it is also possible that the cable 43 is designed as an elastic cable, whereby the aforementioned cushioning and damping effect is achieved. The cable 43 can however also be designed as an endless, annular cable loop, whereby by means of this double strand it is possible to achieve technical advantages with respect to the tensile strength and cable guiding.

Figure 6:
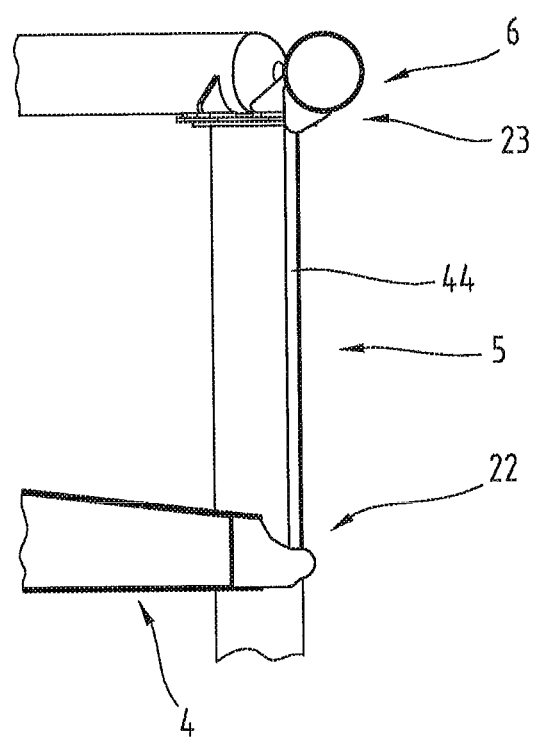
FIG. 6 shows a vertical cross-section of the substructure, in particular according to the section line IV-IV in FIG. 3 with a rod as tensioning means.

FIG. 6 shows an additional and possibly independent embodiment of the substructure 1, wherein the same reference numerals have been used for the same parts as in the preceding FIGS. 4 and 5. To avoid unnecessary repetition, reference is made to the detailed description of the preceding FIGS. 4 and 5.

As shown in the embodiment variant shown in FIG. 6 it is also possible that the tensioning means 5 is designed in the form of a rod 44, which is connected for example by a force-fitting or material bonded connection to the support device 6 or the platform 4. In such an embodiment variant the articulated connections 22, 23 are formed in that there may be an elastic deformation of the rod 44.

FIG. 7 shows a detailed view of a preferred embodiment variant of the articulated connection 22, 23, wherein the latter a preferably designed in combination with a tensioning rod 34. As shown in FIG. 7, the articulated connections 22, 23 can be formed by a spherical head connection 45. In this case it is possible that a spherical element 46 is passed through by a bolt 47. The spherical element 46 is here preferably mounted pivotably in a corresponding spherical mount 48, so that the tensioning means 5 can be pivoted in pivoting direction 49 relative to the bolt 47. In addition, it is possible that either the spherical element 46 can be pivoted relative to the bolt 47 relative to a bolt axis 50, or that the bolt 47 can be pivoted relative to a fork 51, in which the bolt 47 is mounted, relative to the bolt axis 50. By means of this design of the articulated connection 22, 23 it is possible that the tensioning means 5 can be pivoted freely in all directions relative to the platform 4 or the support device 6.

Furthermore, it is possible that the spherical mount 48 is adjustable in adjusting direction 52 relative to the tensioning rod 34. In this way it is possible that the length of the tensioning means of 5 is adjustable. This is an advantage to be able to balance out manufacturing tolerances in the substructure 1 and to set up the platform 4 as precisely as possible in the horizontal plane. Of course, this adjustability of the length of the tensioning means 5 can also be provided at a different point of the tensioning means 5.

FIG. 8 shows in side view a detail of a possible embodiment variant for connecting two adjacent bearing support elements 15, in particular from their end faces 17 with a joint high-voltage insulator 11 designed as a support 8. As shown in FIG. 8, it is possible that an elastic intermediate element 53 is formed which is inserted between the insulator head 14 and base 19. Said elastic intermediate element 53 is provided in order to balance out a tilting or pivot movement 54 of the high-voltage insulator 11 occurring during an earthquake, so that the connection between the bearing support element 15 and high-voltage insulator 11 does not fail. In particular by means of the elastic intermediate element 53 an angular offset should be balanced out between a high-voltage insulator 11 and the bearing support elements 15 thereon.

The elastic intermediate element 53 can be made for example from an elastic plastic material. Of course, it is also possible to use a different material here. Furthermore, it is possible that the elastic intermediate element 53 is made from an electrically insulating material, so that two adjacent bearing support elements 15 are electrically insulated from one another.

Figure 9:
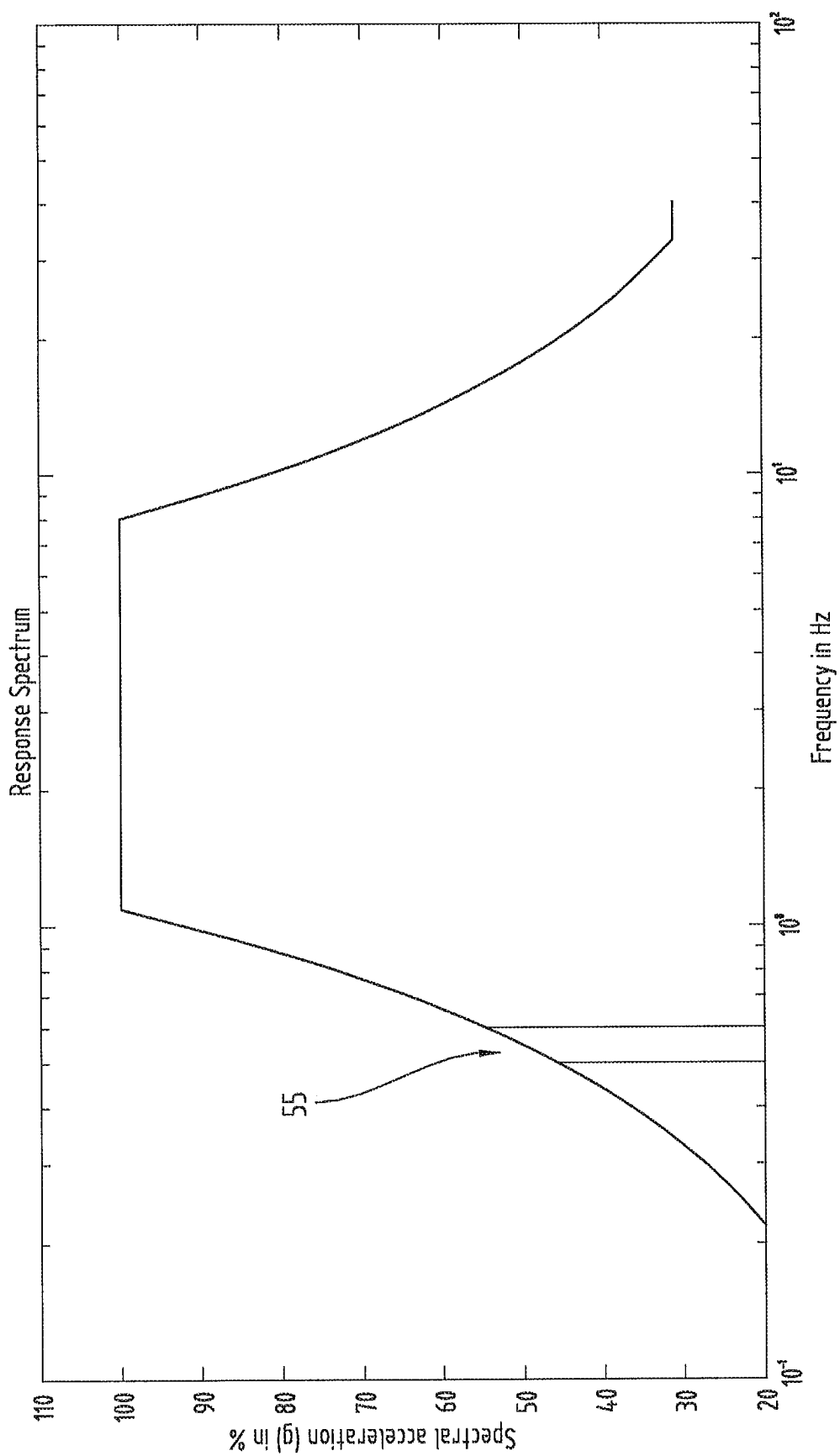
FIG. 9 shows a diagram for illustrating a characteristic excitation frequency of an earthquake.

FIG. 9 shows in a diagram the transverse accelerations caused by an earthquake, which are more amplified in a specific frequency spectrum. On the x-axis the excitation frequency caused by the earthquake is entered on a logarithmic scale. On the y-axis the anticipated lateral acceleration is entered as a function of the frequency. The absolute value of the actually anticipated acceleration according to the standard is dependent on the geographic position of the potential installation side, whereby for illustrative purposes a representation has been selected with standard acceleration, wherein 100% of the acceleration corresponds to the highest acceleration value according to the standard or at the location.

As shown in the diagram, the maximum accelerations occur in a frequency spectrum of about 1 Hz to about 10 Hz. Depending on the type of installation conventional substructures for installing a choke coil have a first resonant frequency, which falls exactly within said critical frequency range, whereby in the case of an earthquake a resonance catastrophe may occur.

By means of the design of the substructure 1 according to the invention, in particular by adjusting the length 35 of the tensioning means 5 as a function of the length of the high-voltage insulator 11, it is possible that the first resonant frequency of the choke coil substructure system is pushed into an operating range 55 of about 0.4 Hz to 0.5 Hz. In this way the maximum accelerations occurring in this way are significantly lower which results in increased earthquake resistance.

By means of the design of the substructure 1 according to the invention it is also possible that the high-voltage insulators 11 function as vibration dampers, whereby the earthquake resistance is also influenced positively.

Depending on the level of voltage applied to the high-voltage component 2, depending on the length of the high-voltage insulators 11 used and depending on the length of the tensioning means 5 the platform 4 is mostly located more than 1 m above ground level. Particularly in power supply networks in the high and extremely high voltage range, both for direct current and also alternating current, the platform 4 is located with the choke coil 3 up to 20 m above ground level, which requirements are met by the substructure 1 according to the invention in an advantageous manner.

The exemplary embodiments show possible embodiment variants of the substructure 1, whereby it should be noted at this point that the invention is not restricted to the embodiment variants shown in particular, but rather various different combinations of the individual embodiment variants are also possible and this variability, due to the teaching on technical procedure, lies within the ability of a person skilled in the art in this technical field.

Furthermore, individual features or combinations of features from the various shown and described example embodiments can represent in themselves independent solutions according to the invention.

The objective addressed by the independent solutions according to the invention can be taken from the description.

All of the details relating to value ranges in the present description are defined such that the latter include any and all part ranges, e.g. a range of 1 to 10 means that all part ranges, starting from the lower limit of 1 to the upper limit 10 are included, i.e. the whole part range beginning with a lower limit of 1 or above and ending at an upper limit of 10 or less, e.g. 1 to 1.7, or 3.2 to 8.1 or 5.5 to 10.

Mainly the embodiments shown in detail in FIGS. 1 to 3, 4, 5, 6, 7 and 8 can form the subject matter of independent solutions according to the invention. The objectives and solutions according to the invention relating thereto can be taken from the detailed descriptions of these figures.

Finally, as a point of formality, it should be noted that for a better understanding of the structure of the substructure the latter and its components have not been represented true to scale in part and/or have been enlarged and/or reduced in size

| | List of reference numerals |
|---|---|
| 1 | substructure |
| 2 | high-voltage component |
| 3 | choke coil |
| 4 | platform |
| 5 | tensioning means |
| 6 | support device |
| 7 | support structure |
| 8 | support columns |
| 9 | ground |
| 10 | contact plane |
| 11 | high-voltage insulator |
| 12 | conical high-voltage insulator |
| 13 | insulation base |
| 14 | insulation head |
| 15 | bearing support element |
| 16 | long bearing support element |
| 17 | end face |
| 18 | transitional section |
| 19 | base |
| 20 | distance of bearing support elements from one another |
| 21 | longitudinal centre |
| 22 | first articulated connection |
| 23 | second articulated connection |
| 24 | corona ring |
| 25 | support arm |
| 26 | nodal point |
| 27 | longitudinal direction of a support arm |
| 28 | node plate |
| 29 | angle |
| 30 | bearing support element |
| 31 | contact surface |
| 32 | strut |
| 33 | connecting element |
| 34 | tensioning rod |
| 35 | length |
| 36 | distance of articulated connections to one another |
| 37 | axis of rotation first rotary joint |
| 38 | axis of rotation of second rotary joint |
| 39 | damping element |
| 40 | long bearing support element |
| 41 | spring element |
| 42 | vibration damper |
| 43 | cable |
| 44 | rod |
| 45 | spherical-headed connection |
| 46 | spherical element |
| 47 | bolt |

-continued

| List of reference numerals | |
|---|---|
| 48 | spherical mount |
| 49 | pivot direction |
| 50 | bolt axis |
| 51 | fork |
| 52 | adjusting direction |
| 53 | elastic intermediate element |
| 54 | pivot movement |
| 55 | operating area |

The invention claimed is:

1. A substructure for increasing the earthquake resistance of at least one high-voltage component, comprising a platform having at least three support arms, wherein the platform is designed for mounting the high-voltage component in a load bearing manner and is suspended via at least three tensioning devices on a support device of a support structure,
   wherein the platform is connected to the at least three tensioning devices by at least three first articulated connections, respectively, located on the at least three support arms, respectively, at a distance from a common nodal point connecting the at least three support arms, and the tensioning devices are connected respectively by a second articulated connection to the support device, which support device is supported on the ground via at least three supports,
   wherein the at least three supports are formed by high-voltage insulators made from an electrically insulating material, which electrically insulate the at least one high-voltage component from ground potential and support it on the ground in a load-bearing manner, and
   wherein the platform is designed to be star-shaped in a view of a contact plane of the support structure.

2. The substructure as claimed in claim 1, wherein the supports have a length of 10 m and a length of each of the at least three tensioning devices is between 1.3 m and 1.5 m.

3. The substructure as claimed in claim 1, wherein the at least three tensioning devices are aligned to be perpendicular and are arranged parallel to one another between the support device and the platform.

4. The substructure as claimed in claim 1, wherein the at least three tensioning devices are designed in the form of tensioning rods.

5. The substructure according to claim 1, wherein the at least three tensioning devices are formed by cables.

6. The substructure as claimed in claim 1, wherein the at least three tensioning devices are made from an electrically insulating material.

7. The substructure as claimed in claim 1, wherein the support device comprises at least three bearing support elements, wherein the at least three bearing support elements have at least approximately the same length and are arranged next to one another to form a ring or circle, and
   wherein at least two of the at least three bearing support elements are arranged on their facing end faces at a distance from one another.

8. The substructure as claimed in claim 7, wherein the two end faces are arranged in a row on a common high-voltage insulator respectively.

9. The substructure as claimed in claim 7, wherein at least one transitional section between consecutive ones of the at least three bearing support elements arranged in a ring is designed to be electrically insulating.

10. The substructure as claimed in claim 8, wherein between at least one of the high-voltage insulators and the at least three bearing support elements supported thereon an elastic intermediate element is arranged.

11. The substructure as claimed in claim 1, wherein at least one of the at least three tensioning devices in the longitudinal center is connected by at least one of the at least three bearing support elements to said bearing support element.

12. The substructure as claimed in claim 7, wherein at least one bearing support element of the at least three bearing support elements is made from an electrically insulating material, so that the high-voltage component is electrically insulated from the platform.

13. The substructure as claimed in claim 1, wherein on at least one of the articulated connections at least one field control device is arranged.

14. The substructure as claimed in claim 1, wherein between the platform and the support structure at least one damping element is arranged for damping horizontal oscillatory movements of the platform.

15. The substructure as claimed in claim 1, wherein the high-voltage insulators are arranged axially parallel to one another to form the support structure.

16. The substructure as claimed in claim 1, wherein the at least three tensioning devices are made from an elastic material and/or comprise at least one spring element, and
   wherein at least one of the tensioning devices comprises a vibration damper.

17. The substructure as claimed in claim 1, wherein the first and/or second articulated connection is formed by a spherical head connection, which comprises a flexibly mounted spherical element, through which a bolt passes.

18. A substructure for increasing the earthquake resistance of at least one high-voltage component, comprising a platform, which is designed for mounting the high-voltage component in a load bearing manner and which platform is suspended via at least three tensioning devices on a support device of a support structure,
   wherein the platform is connected to the at least three tensioning devices by a first articulated connection, and the at least three tensioning devices are connected respectively by a second articulated connection to the support device, which support device is supported on the ground via at least three supports,
   wherein the supports are formed by high-voltage insulators made from an electrically insulating material, which electrically insulate the at least one high-voltage component from ground potential and support it on the ground in a load-bearing manner,
   wherein the support device comprises at least three bearing support elements, which bearing support elements have at least approximately the same length and are arranged next to one another to form a ring or circle,
   wherein in a region near end faces of the at least three bearing support elements, the at least three bearing support elements are connected to the at least three supports, which at least three supports are supported on the ground, and
   wherein in a region in between two of the two end faces of one of the at least three bearing support elements, one of the at least three tensioning devices is connected to the support element.

19. A substructure for increasing the earthquake resistance of at least one high-voltage component, comprising a platform, which is designed for mounting the high-voltage component in a load bearing manner and which platform is suspended via at least three tensioning devices on a support device of a support structure, wherein the platform is connected to the at least three tensioning devices by a first articulated connection, and the at least three tensioning devices are connected respectively by a second articulated connection to the support device, which support device is supported on the ground via at least three supports, wherein the supports are formed by high-voltage insulators made from an electrically insulating material, which electrically insulate the at least one high-voltage component from ground potential and support it on the ground in a load-bearing manner, wherein the support device comprises at least three bearing support elements, wherein the at least three bearing support elements have at least approximately the same length and are arranged next to one another to form a ring or circle, wherein the at least three bearing support elements are connected to the at least three supports, wherein the at least three supports are supported on the ground, and wherein the second articulated connection is located on the at least three bearing support elements.

* * * * *

UNITED STATES PATENT AND TRADEMARK OFFICE
CERTIFICATE OF CORRECTION

PATENT NO. : 10,658,821 B2
APPLICATION NO. : 15/326803
DATED : May 19, 2020
INVENTOR(S) : Eder et al.

Page 1 of 1

It is certified that error appears in the above-identified patent and that said Letters Patent is hereby corrected as shown below:

In the Claims

In Claim 18, Line 27 (Column 16, Line 61), please delete "two" (second occurrence).

Signed and Sealed this
Seventh Day of July, 2020

Andrei Iancu
*Director of the United States Patent and Trademark Office*